Nov. 13, 1956 W. R. BROWN 2,770,345
POSITION DETERMINING DEVICE
Filed April 25, 1955 5 Sheets-Sheet 1

William Ray Brown
INVENTOR.

BY Brownings, Simms & Hyer
ATTORNEYS

Nov. 13, 1956 W. R. BROWN 2,770,345
POSITION DETERMINING DEVICE
Filed April 25, 1955 5 Sheets-Sheet 2

William Ray Brown
INVENTOR.

BY
ATTORNEYS

Nov. 13, 1956 W. R. BROWN 2,770,345
POSITION DETERMINING DEVICE
Filed April 25, 1955 5 Sheets-Sheet 3

William Ray Brown
INVENTOR.

BY
Browning, Simms & Hyer
ATTORNEYS

William Ray Brown
INVENTOR.

BY Browning, Semmes & Hyer
ATTORNEYS

United States Patent Office 2,770,345
Patented Nov. 13, 1956

2,770,345

POSITION DETERMINING DEVICE

William Ray Brown, Corpus Christi, Tex.

Application April 25, 1955, Serial No. 503,607

12 Claims. (Cl. 197—189)

This invention relates to a device for determining the position of the line of typing of a typewriter or the like relative to an end of a sheet of paper inserted in the platen thereof. In one of its aspects, it relates to an improved device of this type by means of which the typist may determine such relative position of the line of typing without reference to the position of the sheet itself, but rather by mere observation of indicia on the device. In another of its aspects, it relates to an improved device of this type which is of such size and shape that it may be attached to or form a part of the endmost portion of the platen.

Devices of this general type are known in the art as "page end indicators" and, as above-mentioned, provide a means by which the typist or operator of a machine such as typewriter having a rotatable platen can, by visual observation, determine the position of the line of typing relative to one or both ends of a sheet of paper inserted into the platen. The two principal uses of these devices are (1) to permit the typist to begin typing with a predetermined margin at the top of the sheet or page and (2) to permit the typist to know at any given time the distance to the bottom of the page so that, for example, a predetermined bottom margin may be observed.

Broadly, such devices comprise either attachments for or integral parts of the platen having indicia arranged concentrically thereof and representative of the travel of a sheet of paper in response to rotation of the platen. Thus, as a sheet of paper is moved within the platen, the position of the line of typing relative to an end of the sheet is determined by observation of the indicia in connection with a datum point fixedly disposed with respect to the typewriter. Conventional typewriter controls enable the typist to set or preposition the device and sheet of paper relative to one another prior to the time typing is begun.

However, the length of a standard sheet of paper is normally two to three times the circumference of the typewriter platen. As a result, to be successful, such a device must enable the typist to quickly determine whether the sheet has traveled in response to one, two, or possibly three revolutions of the platen and, therefore, earlier efforts in this field have centered about devices in which the indicia comprise numerals providing a continuous scale representative of two or more platen circumferences.

The simplest of these, at least from the standpoint of fabrication, comprises a device in which the scale includes separate side-by-side portions, each of which represents one platen circumference or movement in response to one revolution of the platen. An example of such a device is shown in Patent No. 2,633,969 to Unterweiser. However, these latter devices require that the typist make a mental note of the general position of the sheet of paper in the typewriter to determine which portion of the scale is to be read in connection with the datum point.

Although of an understandably more complex nature, other page end indicators have provided a means of permitting the line of typing to be determined without reference to the sheet. Basically, this direct observation is enabled by a correlation, as by reduction gearing, of the rotation of an indicia bearing part to that of the platen so that the former is caused to make only one revolution during a predetermined number of revolutions of the platen. As shown in the device of Patent No. 2,295,275 to Widenham, this construction permits the scale to be arranged in a single circular path.

An object of this invention is to provide a device of the page end indicator type in which the numerals of the continuous scale for indicating two or more revolutions of the platen are so chosen that they may be arranged on a part rotatable with the platen and in a single circular path about the platen.

Another object is to provide a device of the type in which the typist may determine the relative position of the line of typing without reference to the position of the sheet, and which is an improvement over the prior art devices of this type in that it requires no complicated gearing arrangement or fixed connection with the typewriter.

Still another object is to provide an integral device of this general type which is provided with separate indicia for quickly and directly determining the line of typing relative to each of the top and bottom of the sheet and which is detachably connectable to the platen in a manner to permit it to be alternately positioned for observation of either of said separate indicia.

Other objects, advantages and features of this invention will be apparent to one skilled in the art upon a consideration of the written specification, the attached claims and the annexed drawings.

In the drawings, wherein like reference characters are used throughout to designate like parts.

The preferred embodiment or form of the present invention comprises a first member rotatable with the platen and a second member connected to said first member for rotation in response thereto, but being free of the typewriter for movement relative to both the typewriter and said second member. One of said members is provided with indicia arranged concentrically of the axis of rotation thereof and including numerals which provide a continuous scale representative of the distance traveled by said platen during two or more revolutions of said one member, and the other of said members has means which provides a datum point for indicating to the typist which numeral of the indicia is to be read in determining the position of the line of typing. More particularly, the numerals of such indicia, the connection of the first and second members, and the datum point providing means are each so constructed and arranged relative to one another that the line of typing may be determined by the typist by direct observation, and without reference to the general location of the sheet within the platen.

Another form of this invention comprises a device having simply a part rotatable with the platen which includes indicia thereon disposable concentrically of the platen and visually observable by the typist. In accordance with the present invention, the numerals comprising said indicia, and providing a consecutive scale for indicating two or more revolutions of the platen, are arranged in a single circular path. In this manner, the scale is of minimum width and thus may be applied as a tape concentrically about an endmost portion of the platen or, if desired, may form an integral part of said endmost portion.

Figure 1:
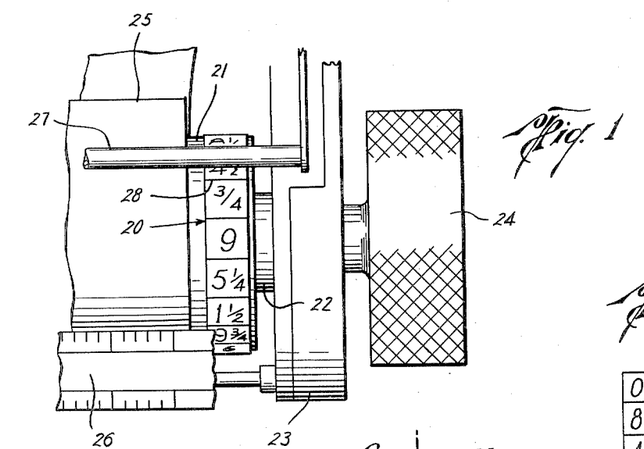
Fig. 1 is an enlarged elevational view of one form of the device of the present invention on a typewriter in generally the position from which it would be viewed by the typist.
Figure 2:
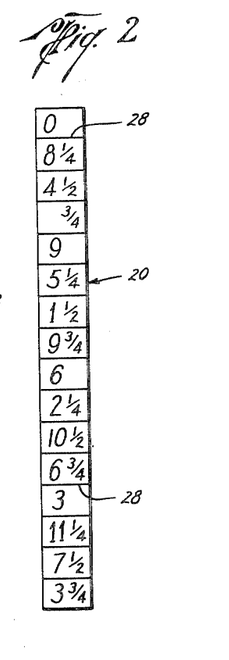
Fig. 2 is a view of the device of the type shown in Fig. 1 removed from the typewriter platen.

Referring now in particular to the drawings, the simpler and second-mentioned of the embodiments of the present invention, indicated in its entirety by the numeral 20 of Fig. 1, is disposed about an endmost portion of a typewriter platen 21. As indicated in Fig. 2, this device 20 may be fabricated as a separate elongate tape or strip having indicia disposed lengthwise of one side thereof and being of a length for surrounding the typewriter platen. Thus, when the tape is extended about the platen and secured thereto, as by adhesive on the back side thereof, it provides a continuous scale arranged concentrically of such platen. In accordance with this invention the numerals of such indicia represent a whole number of multiples of the platen circumference and are arranged thereabout in a single circular path.

Figure 3:
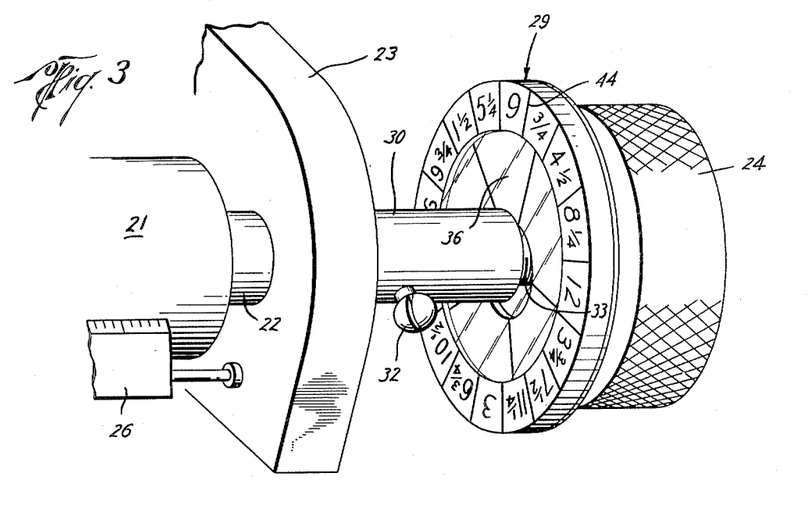
Fig. 3 is an enlarged perspective view of a preferred form of the device attached to a typewriter in at least approximately the position from which it would be viewed by the typist.

Of course, this device may be formed integrally with the platen substantially in the position shown. Also, it may form an integral part of or be attachable as a tape to the platen knob 24, or, for that matter, may itself comprise a knob for manually rotating the platen. Still further, it may be fabricated as a disc with the indicia arranged for observation by the typist, as shown in Fig. 3. Still other possibilities will be suggested to one skilled in the art from a reading of the description to follow.

As well known in the art, the shaft 22 of the rotatable platen 21 is journaled in a fixed frame portion 23 of the typewriter and carries the knurled knob 24 for manual rotation. A sheet of paper 25 inserted within the platen is held down or pressed against the platen just beneath the line of typing by a paper centering scale 26 and above the line of typing by a pivoted holddown bar 27. As will be described hereinafter, either of the members 26 or 27 may be used as a datum point for reference to the indicia on the device 20 in determining the line of typing upon the sheet of paper 25 relative to an end of such sheet of paper.

Inasmuch as the numerals of the indicia thereof are arranged in a single circular path, the device 20 is of a minimum width such that it may surround the platen about its endmost portion without being obscured in any way by the sheet of paper 25. That is, in practically all instances the side edge of the sheet will not extend outwardly beyond the position shown. On the other hand, a device which comprises two or more scale portions arranged side by side could not be used with this assurance as they would ordinarily be obscured at least in part by the average sized sheet of paper.

The numerals of the indicia on the device 20 are multiples of a unit of measurement which is an aliquant of the circumference of the platen 21 and an aliquot of a whole number times such platen circumference, such whole number preferably being chosen in accordance with the size of sheet which it is desired to accommodate. In the illustrative embodiment of Figs. 1 and 2, the platen 21 has a 4-inch circumference and the unit of measurement chosen is an aliquant of the platen circumference and an aliquot of three times such circumference, although it will be understood that a unit of measurement satisfying this formula for other whole number multiples of the platen circumference may be chosen. This particular scale provides a convenient means of determining the line of typing upon sheets of paper up to 12 inches of length and, with certain adjustments, for longer sheets of paper. Although other units of measurement will satisfy the formula mentioned above for three platen circumferences, and the novel concepts of this invention should not be limited to this illustration, the ¾-inch unit was chosen because it not only is a commonly used measurement but also, as will be apparent from the description to follow, it satisfies the above formula for other standard typewriter platens wherein the multiple chosen is three.

The most standard sheet lengths are 11 inch and 14 inch. Although it might first be thought that the whole number multiple "3" was ill-chosen in this respect, 4-inch platens are found only on portable typewriters which are seldom used for typing on 14-inch sheets. Also, this multiple provides a continuous scale for accommodating both sheet sizes on other larger typewriter platens.

As can be best seen from Fig. 2, the numerals provide a continuous scale representative of three platen circumferences and are arranged consecutively with successive ones of said numerals being spaced apart a distance at least approximately corresponding to the unit of measurement. In the instance shown wherein the scale is equal in length to the platen circumference, the spacing between such successive numerals at least approximately equals the unit of measurement. For example, the numeral "¾" is spaced approximately ¾ of an inch from the numeral "0," while the numeral "0," on the other hand, is spaced approximately ¾ of an inch from the numeral "11¼." Of course, in this respect, the numeral "12" may be used instead of "0," the latter being chosen for convenience in setting this particular device, as will be described hereinafter.

The indicia upon the device 20 also include a dividing line for reference to each of the numerals. Thus, the dividing lines, indicated by reference characters 28, are equally spaced apart a distance equal to the unit of measurement (¾ of an inch) divided by said whole number (3), such that in the scale illustrated, each line 28 is spaced from its adjacent line ¼ of an inch.

The indicia shown comprise what may be termed an "ascending order" scale which enables a direct reading of the distance of the line of typing from the top of the sheet. By "direct reading," it is meant that the indicated numeral represents this distance without the necessity of making adjustments for the indicated numeral with respect to the length of the sheet. It will be understood then that "descending order" has reference to a scale which enables a direct reading of the distance from the line of typing to the bottom of the sheet.

As previously mentioned, although the device 20 enables an arrangement of the indicia in a single circular path concentrically of the platen, the typist must still make reference to the general location of the sheet of paper 25 in reading the device. That is, the typist must determine which of the scale portions is controlling. For example, with reference to Fig. 1 and with the upper edge of paper centering scale 26 as the datum point, the typist must decide whether the controlling numeral is "9¾," "1½," or "5¼."

By reference to the general amount of the sheet 25 which has been rotated through the platen 21, the typist knows that the "1½" numeral is controlling. The typist also knows that the scale has advanced beyond the "1½" numeral toward the next successive numeral in the scale, and that this numeral is "2¼" on the ascending scale. The typist is then able to interpolate the proportional distance that the line of typing has traveled beyond "1½," but less than "2¼" from the top of the sheet. For example, if the platen were turned a short distance beyond the position shown in Fig. 1, such that the datum point would be substantially aligned with the numeral "9¾," the typist would know that the line of typing was approximately ¼-inch beyond 1½ inches, or 1¾ inches from the top end of the sheet 25. That is, the typist could determine that the platen had rotated approximately one-third of the distance between "1½" and "2¼" on the scale. In the exact position of the platen shown in Fig. 1, the position of the line of typing would be approximately 1%6 of an inch from the top end of the sheet.

Of course, the device 20 and sheet of paper must be initially set with respect to one another to permit readings in the manner above-noted. Thus, the sheet of paper may be advanced within the platen until the top end thereof is even with the line of typing of the typewriter, the sheet held stationary against the paper table (not shown), and the paper release lever (not shown) pulled to permit the platen to be rotated relative to the sheet to a position wherein the datum point is opposite the desired numeral, at which time the paper release lever may be released. For example, the platen may be rotated until the scale 26 is opposite the numeral "0" so that the device would indicate the position of the line of typing relative to the top of the sheet, as in the above illustration in connection with Fig. 1.

As an alternative to the above, the device may be set prior to inserting the sheet within the platen by making a necessary adjustment for travel of the sheet in the platen to bring its top end up to the line of typing. For example, on a "Royal" portable typewriter having a 4-inch platen, the distance from the point of paper insertion to the line of typing is 2 inches less one line. Thus, the platen would be turned until the numeral "6" was opposite the scale 26, advanced one line, and the paper then inserted into the platen and rotated until the line of typing was at the top of the sheet.

Similar procedures would be employed in connection with the bar 27 as a datum point. However, inasmuch as these procedures are well known to those skilled in the art, further discussion is thought unnecessary. It will also be understood that the device 20 could be releasably secured to the platen in a manner to permit the sheet to be rotated into a position with its top end at the line of typing and suitable adjustment of the device made at that time.

Of course, if the device were not disposed about the endmost portion of the platen, it would not have the advantage of a readily available datum point on the typewriter. However, datum points, if desired, could be fixedly secured to the typewriter at any location desired or, on the other hand, the device could be read by the typist without the use of a tangible datum point upon the typewriter. That is, the indicia may be read by the typist with reference to a relatively fixed line of sight which would constitute a datum point, as, for example, the topmost level of the device.

Although in the device 20 illustrated in Figs. 1 and 2, the numerals define a scale of the ascending order type, a mere reversal of such numerals would provide a scale of the descending order type whereby a direct reading could be made of the distance on the sheet from the line of typing to the bottom end of such sheet. Also, and in accordance with one novel concept of this invention, a tape such as is shown in Fig. 2, or any other separately attachable device, could be provided with an ascending scale on one side and a descending scale on the other, such that it could be selectively used by the typist for alternative purposes.

A preferred form of this device is shown in perspective operatively positioned upon a typewriter in Fig. 3 and is designated in its entirety by the numeral 29. This perspective view illustrates the approximate angle at which the typist would view the device 29, as compared with the viewing of the device 20. However, the frame 23, 4-inch platen 21, platen shaft 22, and knob 24 correspond to similar parts of the typewriter shown in Fig. 1. There is further shown in Fig. 3 the paper centering scale 26, although the holddown bar 27 cannot be seen as it is contemplated that it would be in a raised position upon the frame prior to insertion of a sheet of paper (not shown).

In the illustrated embodiment of the drawings, the device 29 is disposed between the frame 23 of the typewriter and the knob 24 and, more particularly, upon an extension 30 of the platen shaft 22. This extension may be found necessary when the device is so disposed, although the length of shaft between the frame and knob may be sufficient in other cases. Also, similarly to the device 20, the device 29 may actually be substituted for the knob 24 so as to provide the means of manually rotating the platen shaft.

Figure 4:
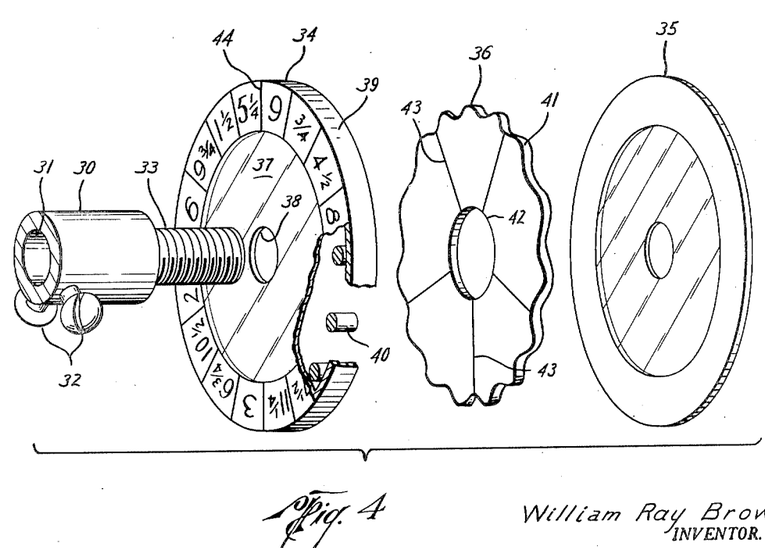
Fig. 4 is an exploded view of the parts of the device shown in Fig. 3.
Figure 6:
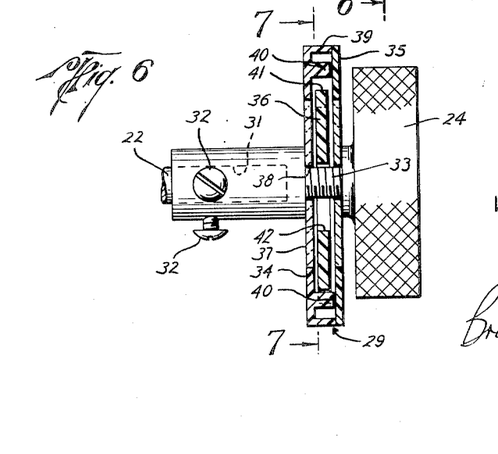
Fig. 6 is a vertical sectional view of the preferred form of the device, taken substantially along broken lines 6—6 of Fig. 5.

As shown in Figs. 4 and 6, the extension 30 is provided with a bore 31 at its inner end for receiving the reduced end of platen shaft 22 to which the knob 24 is normally secured. In this manner, the extension can be secured to the shaft 22 by means of set screws 32 while the knob 24 may be threadedly connected to a reduced portion 33 at the outer end of the extension.

Also secured to the portion 33 of the extension 30, as by threading cementing or lock nuts, are separable parts 34 and 35 of the indicia bearing member of the device 29. Within the parts 34 and 35 of the indicia bearing member is a datum point providing means in the form of an indicating member 36 so connected to the indicia bearing member as to be free of the portion 33 of the platen shaft extension. Thus, as will be described more fully hereinafter, the indicating member 36 is connected to the indicia bearing member for rotation in response to rotation thereof but relative thereto as well as relative to the typewriter.

Figure 5:
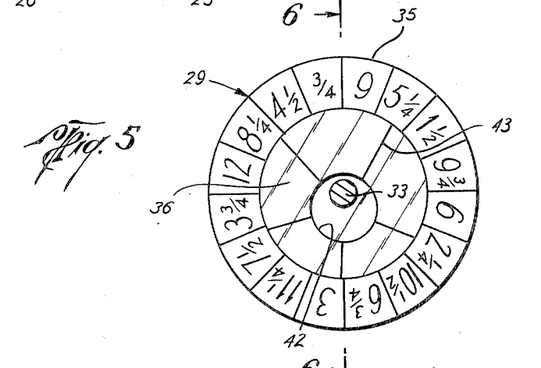
Fig. 5 is a view of the device of Fig. 3 removed from the typewriter and from the side thereof opposite that shown in Figs. 3 and 4.

Referring now in particular to the indicia bearing member of the device 29, the outer face of the part 34 is provided with indicia which, in the position shown in Figs. 3 and 4, are visually observable by the typist. The numerals of this indicia provide a scale which is the same as that provided for the device 20 of Figs. 1 and 2, except that it is of the descending order type especially adapted for direct reading of the position of the line of typing with respect to the bottom end of the paper. However, a scale identical to Figs. 1 and 2 may be provided on the oppositely disposed face of the other part 35 of the indicia bearing member, as shown in Fig. 5. Similarly to the device 20, this arrangement provides a device 29 which is reversible in position with respect to the platen so as to permit the typist to use either the ascending or descending order scale.

The part 34 is substantially cup-shaped and has a disc-like portion 37 with a central aperture 38 therethrough for securement to platen shaft portion 33, with the indicia upon this part being arranged concentrically of aperture 38 so as to also be concentric of the platen. The part 34 may be made of any suitable material, such as plastic, with the numerals molded into an opaque portion thereof which surrounds a transparent central portion to permit viewing of the indicating member 36 as shown in Fig. 3.

In addition, the part 34 is provided with a peripheral flange 39 to which the outer edge of disc-like part 35 may be suitably secured, as by cementing, to form a hollow space within the cylindrical indicia bearing member, as shown in Fig. 6, for receiving the indicating member 36. The part 35 is preferably made of the same material as part 34 and provided with an opaque peripheral portion into which the indicia for the ascending scale may be molded and a central transparent portion for viewing the side of indicating member 36 shown in Fig. 5.

Molded integrally with the part 34 are equally spaced apart projections 40 which form a series of concentrically arranged gear teeth within the cylindrical indicia bearing member. For meshing engagement with the teeth so formed in the indicia bearing member, the disc-like indicating member 36 is provided with gear teeth 41 equally spaced about its periphery. In addition, the indicating member 36 is provided with an enlarged central aperture 42 therethrough which is of such size that with the gear teeth 41 in meshing engagement with teeth 40 of the indicia bearing member, the indicating member 36 will be disengaged from the platen shaft portion 33 so as to be free for movement relative thereto.

The numerals upon both parts of the indicia bearing member of the device 29 are read with reference to equally spaced apart and radially directed indicating lines 43 on opposite sides of the indicating member 36. The number of such lines, as well as the ratio of gear teeth 40 to gear teeth 41, are determined, in a manner described below, in accordance with the unit of measurement of the indicia such that the numeral for determining the line of typing relative to one end of the sheet of paper can be read by direct reference to the location of the indicating line as a datum point with respect to a numeral of the indicia, without reference to the general location of the sheet of paper.

Figure 7:
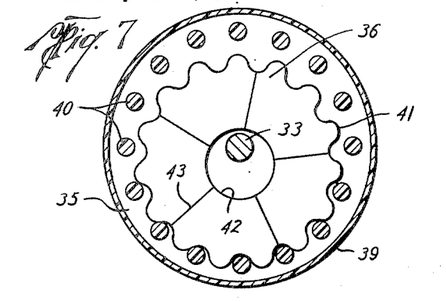
Fig. 7 is a vertical sectional view of the preferred form taken substantially along broken lines 7—7 of Fig. 6, and showing in particular the gearing arrangement between the two members constituting such device.

The aforesaid gearing arrangement comprises a gear ratio between teeth 40 on the indicia bearing member and teeth 41 upon indicating member 36 which corresponds to the ratio of the platen circumference (4 inches in the illustration of the drawings) to the largest multiple of the unit of measurement (¾ inch) which is less than the platen circumference, such largest multiple being in this case 3¾ inches. Thus, the desired gear ratio is 16 to 15, as can be seen from Fig. 7.

The indicating lines 43 correspond in number to the said largest multiple of said unit of measurement which is less than the platen circumference (3¾) divided by said unit of measurement (¾). Thus, the member 36 in the instant illustration is provided with five equally spaced apart indicating lines 43.

Figure 8A:
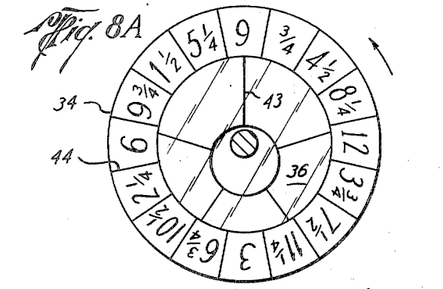
Figs. 8A, 8B and 8C are further views of the preferred form which illustrate the manner of reading same during successive movement of the typewriter platen in the direction of the arrows, the scale shown in these figures being for use with a typewriter having a 4-inch platen and of the descending order type for directly determining the position of the line of typing relative to the bottom of the sheet of paper.
Figure 8B:
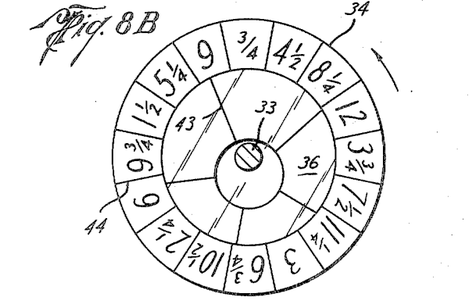
Figure 8C:
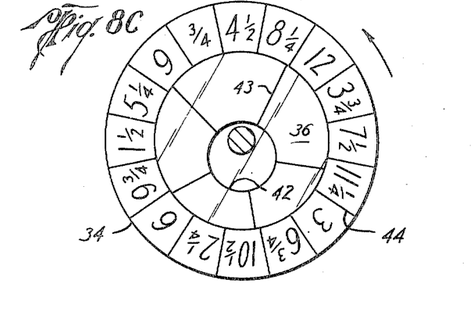

The manner of reading the device 29 will be understood from the description to follow of Figs. 8A to 8C. The controlling numeral is the topmost indicated numeral i. e., the numeral within the dividing lines 44 of which the topmost indicating line 43 is disposed. If such topmost indicating line also points to the topmost numeral, the proper reading is such numeral without interpolation. Thus, for example, in Fig. 8A, the proper reading is "9," so that the typist knows that the line of typing is 9 inches above the bottom of the sheet.

If the topmost indicated numeral is not also the topmost numeral, it is at least adjacent to said topmost numeral and provides a means of determining an appropriate amount to be added or substracted to the topmost indicated numeral. Thus, as shown in Fig. 8B, the topmost indicated numeral is "9," while the adjacent topmost numeral is "¾." Since this is a descending order scale, ¼ inch is subtracted from 9 inches so that the correct reading is 8¾ inches. In the next successive position of the device, as it is shown in Fig. 8C, the next succeeding indicating line 43 has become the topmost and points to "8¼." However, in this case, the topmost numeral "4½" leads the topmost indicated numeral so that ¼ inch is added to 8¼ inches to give a correct reading of 8½ inches.

In a position of the device such as in Fig. 8C, there may be some doubt in the mind of the typist as to which indicating line is topmost, although this should be obvious since the topmost numeral is adjacent to the indicated numeral "8¼." However, assuming that the line pointing to the numeral "9" were taken to be the topmost, the proper reading would still be "8½" as ½ inch would be subtracted from 9 inches since topmost numeral "4½" follows "9" by two numeral spacings or ½ inch.

It is believed apparent from Fig. 3 that the numeral "9" is easily determined as being the topmost. However, if desired, a pointer may be secured to the typewriter for indicating the topmost level of the device. Experience has taught that such is not required, however.

The manner of setting the device 29 is, of course, quite similar to that of setting the device 20 and therefore need not be described in detail. As in the case of the earlier described device, a sheet of paper may be inserted into the platen and turned to a position wherein its top end is at the line of typing. At this time, the sheet may be held in fixed position and appropriate mechanism released so as to turn the platen, and thus the device 29, to a position wherein the desired numeral of the indicia is indicated by the topmost indicating line 43. Thus, using the descending order type scale, the device 29 could be set for determining the position of the line of typing relative to the bottom of an 11-inch sheet of paper by rotating the device until the numeral "11¼" and an indicating line 43 reached the relative position of the numeral "9" and the topmost indicating line shown in Fig. 8B. It will be understood from the foregoing that in this position the device would be set for indicating the distance from the line of typing to the bottom end of the sheet. Also, of course, the indicating device could be set prior to insertion of the paper, as described in connection with the device 20. Still further, the device 29 could be detachably secured to the platen shaft such that it could be set after the sheet of paper had been inserted within the platen and turned to a position in which its top end was at the line of typing.

Figs. 9A to 9C, 10A to 10C, and 11A to 11C illustrate rather diagrammatically devices of the preferred type which may be used with typewriters having platens of 4¾ inch, 5 inch, and 5½ inch circumferences, respectively, and in which the unit of measurement making up the scale of such device is ¾ of an inch as in the illustrated embodiment for a typewriter having a 4-inch platen. The above-mentioned sizes of platens are standard in the typewriter art and thus illustrate the utility of ¾ of an inch as the unit of measurement, although devices may be provided in accordance with this invention for any size of platen.

The formulas by which the gearing ratio of the indicia bearing member to the indicating member 36 is obtained, as well as the number of equally spaced apart indicating lines 43 upon each indicating member 36, have already been described. Also, of course, the number of gear teeth on the indicia bearing member will correspond to a whole number multiple of the numerals making up such indicia. Therefore, with reference to Figs. 9A to 9C, it can be seen that the indicia thereon comprise a continuous scale representative of 14¼ inches, or three times the platen circumference of 4¾ inches. It can also be seen that, in accordance with the above-mentioned formula, the gearing ratio is 19 to 18, while six indicating lines 43 are provided upon the indicating member 36.

Figure 10A:
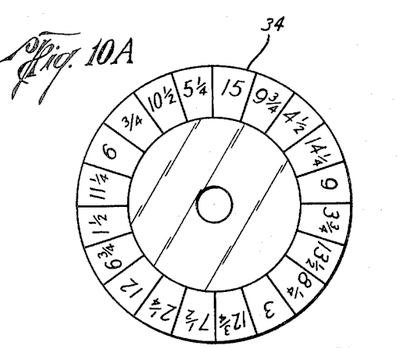
Figs. 10A to 10C are parts corresponding, respectively, to those of Figs. 9A to 9C for use with a typewriter having a 5-inch platen.
Figure 10B:
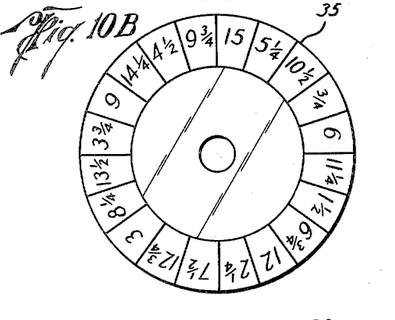
Figure 10C:
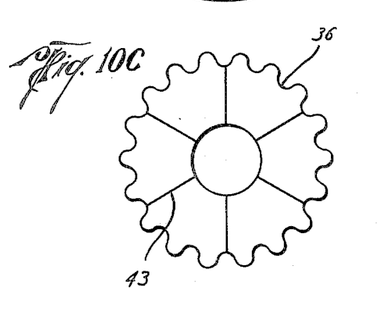

With reference to Figs. 10A to 10C, the device for use with the typewriter having a 5-inch platen has indicia which provides a scale representing three times the platen circumference, or 15 inches. The gearing ratio of this particular illustrative embodiment of the invention is 20 to 18, while six indicating lines 43 are provided on indicating member 36.

Figure 11A:
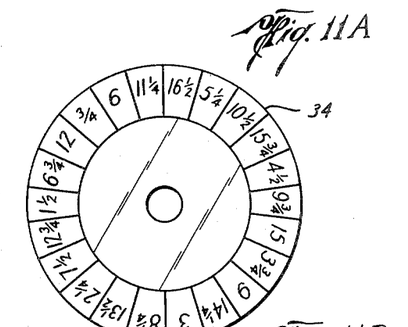
Figs. 11A to 11C are corresponding parts for use with a typewriter having a 5½ inch platen.
Figure 11B:
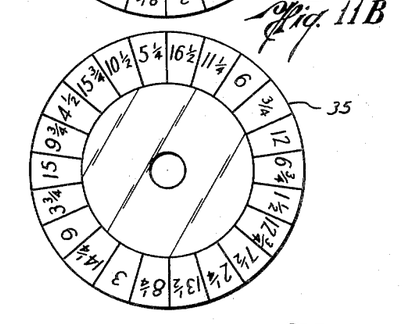
Figure 11C:
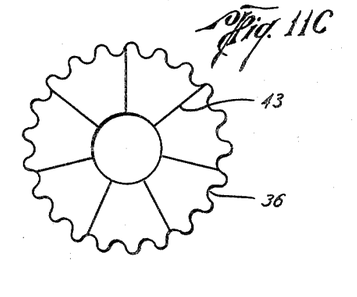

In the embodiment shown diagrammatically in Figs. 11A to 11C, which is for use with a typewritter having a 5½ inch platen, the consecutive scale is provided with numerals representative of three times the platen corcumference, or 16½ inches. Further, the gearing ratio is 22 to 21 and seven indicating lines 43 are provided on the indicating member.

Figure 9A:
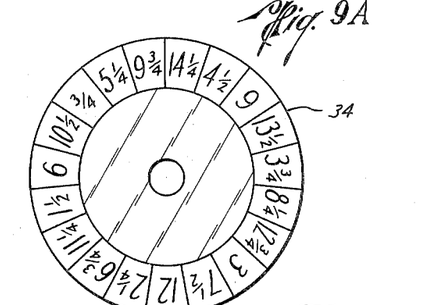
Fig. 9A is a view of a part of an indicia bearing member having a descending order type scale for use with a typewriter having a 4¾ inch platen.
Figure 9B:
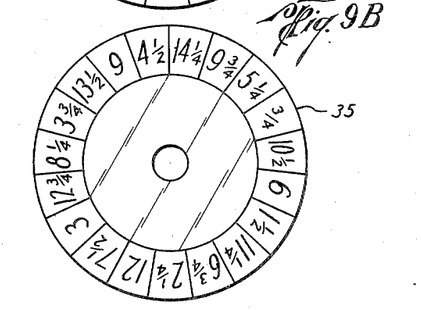
Fig. 9B is a similar view of another part of the indicia bearing member of Fig. 9A having a scale of the ascending order type.
Figure 9C:
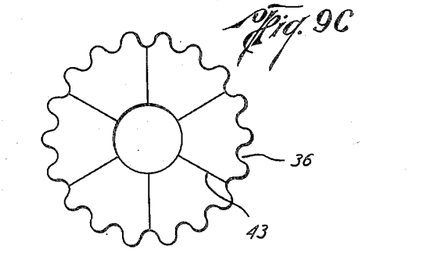
Fig. 9C is a view of an indicating member usable in connection with the parts of Figs. 9A and 9B.

It will further be noted with respect to Figs. 9A to 9C, 10A to 10C, and 11A to 11C, that Figs. 9A, 10A and 11A illustrate consecutive scales of the descending order type, while Figs. 9B, 10B and 11B illustrate continuous scales of the ascending order type.

Figure 12:
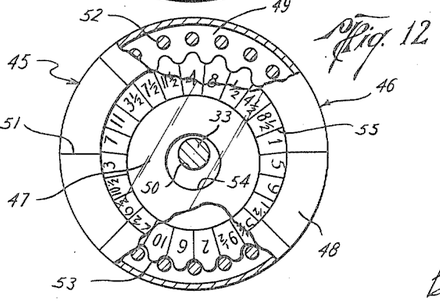
Fig. 12 is a view of one side of an alternative to the preferred form of the device shown in Figs. 3 to 11, in which said device is broken away to illustrate the interior thereof.

An alternative to the above-described preferred device of the present invention is shown in Figs. 12 through 15 and designated in its entirety by the reference numeral 45 (Fig. 12). The principal structural difference between the preferred form and this alternative form is that, in the latter, indicating lines are disposed upon a member 46 which is rotatable with the typewriter platen, while the indicia are disposed on a member 47 free of the platen shaft and connected to said indicating member 46 for rotation relative thereto. Thus, in this alternative form of the device, the indicia include numerals representative of the distance traveled by the platen during a whole number multiple of revolutions of the indicia bearing member 47. As will be apparent from the description to follow, however, these numerals comprise multiples of a unit of measurement which may be so chosen that the distance traveled by the platen during a given number of revolutions of member 47 at least approximates the distance such platen would travel during its own revolution said given number of times. Thus, many of the advantages discussed with respect to the preferred form will also accrue to this alternative form.

The alternative form of the device does not enable the ease of reading which was possible in connection with the preferred form. This is obvious inasmuch as the preferred form employs the larger of the members to bear the indicia, thus enabling the numerals of such indicia to be larger as well as spaced further apart. Furthermore, in the preferred form, the numerals are upon the outer member which facilitates reading of the device from the angle of the typist's line of sight. Still further, as will be apparent from the description to follow, the preferred form generally requires a smaller number of indicia numerals.

Reference is made to Fig. 12 for a description of a typical device 45 which, as shown, is secured to a platen shaft or portion thereof 33. This particular device is for use with a typewriter having a 4-inch platen and is viewed from the side thereof upon which an ascending order type scale is disposed upon the indicia bearing member 47, although it will be understood that in its preferred construction this member includes a descending order type scale upon its opposite side. Each of the disc-like parts 48 and 49 of the indicating member 46 are provided with central apertures 50 adapted to receive and be detachably secured to platen shaft portion 33 such that the device is reversible. Also, each of these parts includes outwardly facing and radially directed indicating lines 51 equally spaced apart about an opague peripheral portion thereof. Similarly to the preferred form of the device, the parts 48 and 49 include inner transparent portions through which the numerals of the indicia bearing member 47 may be viewed.

The indicating member 46 is also provided with a series of concentrically arranged projections 52 which provide gear teeth for meshing engagement with gear teeth 53 about the periphery of indicia bearing member 47. More particularly, the indicia bearing member 47 is disposed within indicating member 46 and is provided with an enlarged central aperture 54 of such size that with gear teeth 52 and 53 in meshing engagement as shown in Fig. 12, the indicia bearing member 47 will be free of platen shaft portion 33 for rotation in response to rotation of indicating member 46. The other structural details of the device 45 need not be mentioned as they correspond to those described in connection with the preferred form of the invention.

The indicia which are arranged concentrically of the axis of rotation of indicia bearing member 47 include numerals to be read in connection with indicating lines 51 of indicating member 46, which numerals are separated by radially directed and equally spaced apart dividing lines 55. However, as mentioned above, the numerals of the indicia are representative of the distance traveled by the platen during a whole number multiple of revolutions of the indicia bearing member 47. Thus, with reference, for example, to the alternative device shown in Figs. 13A and 13B for use with a platen having a 4-inch circumference, the scale is representative of 11½ inches of travel by the platen during three revolutions of the indicia bearing member 47. Further, the device shown in Figs. 14A and 14B is for use with a typewriter having a platen 5 inches in circumference and is provided with a scale representative of 14½ inches travel by the platen during the three revolutions of the indicia bearing member 47. In Figs. 15A and 15B, there is shown a device for use with a typewriter having a 5½ inch circumference wherein the scale is representative of 16 inches of travel by the platen during the three revolutions of the indicia bearing member 47.

Inasmuch as each of the alternative devices may be set and read in the same manner as was the ascending order scale of the preferred forms of the invention, an explanation of same need not be repeated herein. Reference is had in this respect to the foregoing description of Figs. 8A to 8C.

Figure 13A:
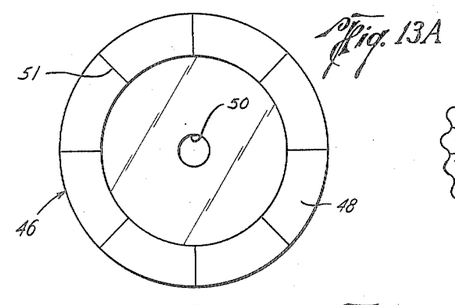
Fig. 13A is a view of one side of an indicating member of the alternative form of the device for use with a typewriter having a 4-inch platen.
Figure 13B:
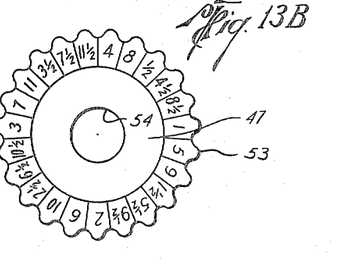
Fig. 13B is a view of one side of an indicia bearing member having an ascending order type scale usable in connection with the indicating member of Fig. 13A.
Figure 14A:
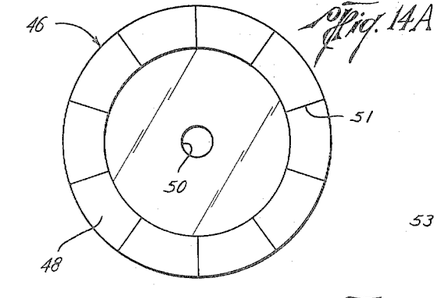
Figs. 14A and 14B are parts corresponding, respectively, to those of Figs. 13A and 13B for use with a typewriter having a 5-inch platen.
Figure 14B:
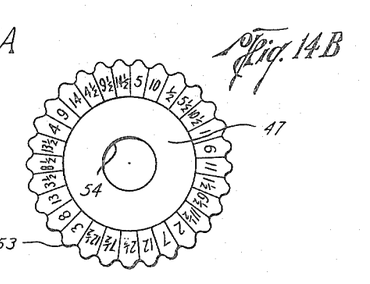
Figure 15A:
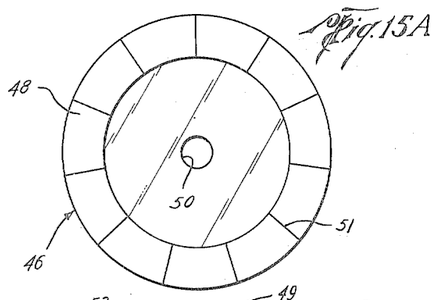
Fig. 15A and 15B are corresponding parts for use with a typewriter having a 5½ inch platen.
Figure 15B:
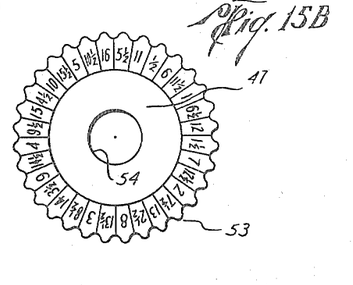

In each embodiment of the alternative device shown in Figs. 13 through 15, the unit of measurement chosen is ½ inch and the number of indicating lines 51 corresponds to the platen circumference divided by said unit of measurement. Thus, in the device of Figs. 13A and 13B, there are eight indicating lines, while in the devices of 14A and 14B and 15A and 15B there are ten and eleven indicating lines, respectively. Furthermore, three gear teeth 52 are provided for each indicating line 51, in the manner shown in connection with Fig. 12, such that the total of these teeth corresponds to three times the number of indicating lines. The number of gear teeth 53 upon indicia bearing member 47 is, in each of the illustrated devices, one less than the number of gear teeth 52. Thus, in the case of the Fig. 13A and Fig. 13B device, the gear ratio is 24 to 23 so that the indicia bearing member 47 will measure ⅙ of an inch less than one revolution of the platen (4 inches x 1/24). Therefore, during three revolutions of indicia bearing member 47, the measurement differential is ½ inch, such that the scale of the device shown in Figs. 13A and 13B is representative of 11½ inches of platen travel. Similarly, the device of Figs. 14A and 14B is representative of 14½ inches of platen travel and the device of Figs. 15A and 15B is representative of 16 inches of platen travel. To be more specific, in the device of Figs. 14A and 14B, the indicating member 46 will have thirty gear teeth, while the indicia bearing member 47 will be provided with twenty-nine gear teeth. In the device of Figs. 15A and 15B for use with a 5½ inch platen, there are thirty-three gear teeth upon indicating member 46 and one less, or thirty-two gear teeth, on the indicia bearing member 47.

Stated another way, the numerals of the indicia are separated by equally spaced apart dividing lines 55 which are arranged about the axis of rotation of the indicia bearing member 47 and include multiples of a unit of measurement which equal the travel of the platen represented by the distance between adjacent dividing lines (⅙ of an inch) multiplied by said whole number multiple of revolutions (three). The gear teeth 52 and 53 of the members 46 and 47, respectively, bear a ratio to one another which corresponds to the ratio of said whole number multiple of indicia bearing member revolutions multiplied by the platen circumference to the distance of platen travel represented by said indicia. Thus, for example, in the case of the device for the 4-inch platen, the gear ratio would correspond to three times four divided by 11⅙, or 24 to 23. Finally, the datum providing means may be said to comprise indicating lines 51 which correspond in number to the platen circumference divided by the unit of measurement. Thus, in the device for use with the 4-inch platen, there are four divided by ½, or eight such indicating lines.

An illustrative device of this alternative form for use with a 4¾ inch platen is not shown inasmuch as its practical value is doubted. That is, the selection of a common unit of measurement was found to result in a relatively large number of numerals and consequently closely spaced together dividing lines which would render the device difficult to read. Of course, a somewhat uncommon unit of measurement could be chosen so as to reduce the number of numerals of the indicia as well as the gears upon the respective members. Also, the device could be enlarged to an extent necessary to permit easier reading. However, the illustrative devices of Figs. 13 through 15 are thought to be sufficiently exemplary of the alternative form of this device. In fact, as previously mentioned, the present invention may be practiced in connection with platens of any circumference, the illustrations serving merely to emphasize the application of this invention to use with commercial typewriters.

As mentioned above in connection with the illustrations of Figs. 13 through 15, the distance between adjacent dividing lines 55 represents a travel of the platen of ⅙ of an inch. Several typewriters are gauged to six typewriting lines to the inch. Thus, with the illustrated devices, a platen movement of one line would correspond to movement from one indicia numeral to the next, which would, of course, facilitate operation of the device.

Although the device of the present invention has been described particularly in connection with typewriters, it is not contemplated that such would be its only use. Thus, a device of this type would find great utility with any machine having a rotatable platen within which a sheet of paper or the like was inserted. Such machines, and especially those having an intermittently rotatable platen, are in widespread use throughout the business world.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for determining the position of the line of typing of a typewriter or the like relative to an end of a sheet of paper inserted in the platen thereof, comprising a first member rotatable with the platen, a second member connectable to said first member for rotation relative thereto, indicia arranged substantially concentrically about the axis of rotation of one of said members and including numerals representative of the distance traveled by the platen during a whole number multiple of revolutions of said one member, and means on the other of said members providing a datum point for indicating the numeral to be read in determining said position of the line of typing, said numerals being arranged about the axis of rotation of said first member and including multiples of a unit of measurement which is an aliquant of the platen circumference and an aliquot of said whole number times the platen circumference, said first and second members being connectable by gears in which the ratio of said first member gear teeth to those of said second member corresponds to the ratio of the platen circumference to the largest multiple of said unit of measurement which is less than the platen circumference, and said datum point providing means comprising equally spaced apart indicating lines which correspond in number to said largest multiple of said unit of measurement which is less than the platen circumference divided by said unit of measurement.

2. A device for determining the position of the line of typing of a typewriter or the like relative to an end of a sheet of paper inserted in the platen thereof, comprising a first member rotatable with the platen, a second member connectable to said first member for rotation relative thereto, indicia arranged substantially concentrically about the axis of rotation of one of said members and including numerals representative of the distance traveled by the platen during a whole number multiple of revolutions of said one member, and means on the other of said members providing a datum point for indicating the numeral to be read in determining said position of the line of typing, said numerals being separated by equally spaced apart dividing lines arranged about the axis of rotation of said second member and including multiples of a unit of measurement which equals the travel of the platen represented by the distance between adjacent dividing lines multiplied by said whole number multiple of revolutions, said first and second members being connectable by gears in which the ratio of said first member gear teeth to those of the second member corresponds to the ratio of said whole number multiple of revolutions multiplied by the platen circumference to the distance of platen travel represented by said indicia, and said datum point providing means comprising equally spaced apart indicating lines which correspond in number to the platen circumference divided by said unit of measurement.

3. A device for determining the position of the line of typing of a typewriter or the like relative to an end of a sheet of paper inserted in the platen thereof, comprising a first member rotatable with the platen and having gear teeth arranged substantially concentrically of its axis of rotation, a second disc-like member having gear teeth about its periphery for meshing engagement with said first member gear teeth, said second member being free of the platen and disposable within the concentric arrangement of the first member gear teeth for rotation in response to rotation of said first member, indicia arranged substantially concentrically about the axis of rotation of one of said members and including numerals representative of the distance traveled by the platen during a whole number multiple of revolutions of said one member, and radially directed lines equally spaced about the other of said members providing a datum point for indicating the numeral to be read in determining said position of the line of typing, the ratio of said first to said second member gear teeth and the number of said indicating lines being so related to said numerals that the numeral to be read is indicated without the necessity of reference by the typist to the location of the sheet within the platen.

4. A device of the character defined in claim 3, wherein said first and second members are received about the platen, said first member being fixedly secured thereto and said second member having an opening surrounding said platen in spaced relation thereto.

5. A device of the character defined in claim 3, wherein said first member includes spaced indicia bearing parts detachably securable to the platen with the gear teeth of said member being disposed between said parts, indicia on one of said parts providing a direct determination of the line of typing relative to the top of said sheet and indicia on the other of said parts facing opposite to the first-mentioned indicia and providing a direct determination of said line relative to the bottom of said sheet, said disc-like second member is provided with indicating lines on its opposite sides for indicating the numeral of similarly facing indicia on an indicia bearing part, and said indicia bearing parts of the first member are transparent at least in part to permit viewing of said indicating lines.

6. A device of the character defined in claim 3, wherein said disc-like second member is provided with indicia on one side thereof providing a direct determination of the line of typing relative to the top of said sheet and indicia on the opposite side thereof providing a direct determination of said line relative to the bottom of the sheet, said first member includes spaced parts detachably securable to the platen with the gear teeth of said first member being disposed between said parts each of which bears indicating lines for indicating the numeral of similarly facing indicia on a side of the second member, and said indicating line bearing parts of the first member are transparent at least in part to permit viewing of said indicia.

7. A device for determining the position of the line of typing of a typewriter or the like relative to an end of a sheet of paper inserted in the platen thereof, comprising a first member rotatable with the platen and having indicia arranged substantially concentrically about its axis of rotation, said indicia including numerals representative of a whole number of multiples of the platen circumference, and a second member geared to the first member for rotation relative thereto and having means thereon providing a datum point for indicating the numeral to be read in determining said position of the line of typing, the ratio of the gearing of said first and second members and the arrangement of said datum point providing means being so related to the numerals that the typist is enabled to determine the numerals to be read without reference to the location of the sheet within the platen.

8. A device of the character defined in claim 7, wherein said first and second members comprise substantially parallel disc-like parts, with the datum point providing means comprising a plurality of equally spaced apart and radially directed indicating lines.

9. A device of the character defined in claim 8, wherein the indicia on said first member includes radially directed and equally spaced apart dividing lines, each of said lines being provided for reference to a numeral of said indicia.

10. A device for determining the position of the line of typing of a typewriter or the like relative to an end of a sheet of paper inserted in the platen thereof, comprising a first member rotatable with the platen, a second member geared to the first member for rotation relative thereto, indicia including numerals arranged substantially concentrically about the axis of rotation of said second member, and means on the first member providing a datum point for indicating the numeral to be read in determining said position of the line of typing, said numerals being representative of the distance traveled by the platen during a whole number multiple of second member revolutions, and the ratio of the gearing of said first and second members and the arrangement of said datum point providing means being so related to the numerals that the typist is enabled to determine the numerals to be read without reference to the location of the sheet within the platen.

11. A device of the character defined in claim 10, wherein said first and second members comprise substantially parallel disc-like parts, with the datum point providing means comprising a plurality of equally spaced apart and radially directed indicating lines.

12. A device of the character defined in claim 11, wherein the indicia on said second member includes radially directed and equally spaced apart dividing lines, each of said lines being provided for reference to a numeral of said indicia.

References Cited in the file of this patent

UNITED STATES PATENTS

| | | |
|---|---|---|
| 2,298,742 | Larose | Oct. 13, 1942 |
| 2,662,629 | Moshier et al. | Dec. 15, 1953 |

FOREIGN PATENTS

| | | |
|---|---|---|
| 322,892 | France | Oct. 21, 1902 |